United States Patent
Foust et al.

(10) Patent No.: US 8,973,376 B2
(45) Date of Patent: Mar. 10, 2015

(54) INTERFACE BETWEEN A COMBUSTOR BASKET AND A TRANSITION OF A GAS TURBINE ENGINE

(75) Inventors: Adam M. Foust, Orlando, FL (US); David J. Gloekler, Berlin (DE)

(73) Assignee: Siemens Aktiengesellschaft, München (DE)

( * ) Notice: Subject to any disclaimer, the term of this patent is extended or adjusted under 35 U.S.C. 154(b) by 980 days.

(21) Appl. No.: 13/088,507

(22) Filed: Apr. 18, 2011

(65) Prior Publication Data

US 2012/0260659 A1    Oct. 18, 2012

(51) Int. Cl.
*F02C 7/28* (2006.01)
*F01D 9/02* (2006.01)

(52) U.S. Cl.
CPC . *F02C 7/28* (2013.01); *F01D 9/023* (2013.01); *F05D 2250/183* (2013.01); *F05D 2240/55* (2013.01)
USPC .................................. 60/800; 60/796; 60/799

(58) Field of Classification Search
CPC .............. F01D 9/023; F23R 3/60; F02C 7/28; F05D 2240/55; F05D 2250/183
USPC ............ 60/800, 799, 796, 752, 756, 758, 760
See application file for complete search history.

(56) References Cited

U.S. PATENT DOCUMENTS

| | | | |
|---|---|---|---|
| 4,901,522 A * | 2/1990 | Commaret et al. | 60/800 |
| 5,079,915 A * | 1/1992 | Veau | 60/766 |
| 5,987,879 A * | 11/1999 | Ono | 60/800 |
| 6,029,455 A * | 2/2000 | Sandelis | 60/752 |
| 7,089,748 B2 * | 8/2006 | Tiemann | 60/800 |
| 7,096,668 B2 | 8/2006 | Martling et al. | |
| 7,340,881 B2 | 3/2008 | Koganezawa et al. | |
| 7,493,767 B2 | 2/2009 | Brunker et al. | |
| 7,524,167 B2 | 4/2009 | Ohri et al. | |
| 8,215,115 B2 * | 7/2012 | Adair et al. | 60/752 |
| 2009/0115141 A1* | 5/2009 | Simmons | 277/630 |
| 2010/0180602 A1* | 7/2010 | Johnson et al. | 60/760 |
| 2012/0036857 A1* | 2/2012 | Bassani | 60/752 |

* cited by examiner

*Primary Examiner* — Phutthiwat Wongwian
*Assistant Examiner* — Carlos A Rivera

(57) ABSTRACT

An interface (10) is provided between a combustor basket (12) and a transition (14) of a gas turbine engine (16). The interface (10) includes a tongue (18) formed in one of the combustor basket (12) and the transition (14), and a groove (20) formed in another of the combustor basket (12) and the transition (14). The tongue (18) is received within the groove (20) to define the interface (10). A sealing arrangement is also provided and includes an annular combustion outlet (12''') and an annular transition inlet (14'''), with a labyrinth seal (72''') positioned between an end (68''') of the annular combustion outlet and an end (70''') of the annular transition inlet to form a labyrinth path (34''') there between. An inner diameter (24''') of the annular combustion outlet (12''') is axially aligned with an inner diameter (22''') of the annular transition outlet (14''').

21 Claims, 4 Drawing Sheets

INTERFACE BETWEEN A COMBUSTOR BASKET AND A TRANSITION OF A GAS TURBINE ENGINE

FIELD OF THE INVENTION

Aspects of the invention are related to turbine engines, and more particularly, to an interface between a combustor basket and a transition of a gas turbine engine.

BACKGROUND OF THE INVENTION

In gas turbine engines, air is compressed at an initial stage, is subsequently heated in combustion chambers, and the hot gas so produced passes to a turbine that, driven by the hot gas, does work which may include rotating the air compressor.

In a typical industrial gas turbine engine, a number of combustion chambers combust fuel. Hot gas flowing from these combustion chambers is passed from a combustor basket and into respective transitions (also referred to as ducts or transition pieces) through an interface between the combustor basket and the respective transition. As the hot gas flows from the combustor basket, through the interface and into the respective transition, a number of design factors of the interface may affect performance criteria of the gas turbine engine. For example, compressed air external to the interface has a tendency to pass through a gap formed by the interface, and thus the interface is designed with some degree of sealing. Additionally, a parameter of the flow of hot gas through the interface, such as a flow direction through the interface, may have an impact on performance criteria of the gas turbine engine. Consequently, the design of such an interface has an impact on various performance criteria of the gas turbine engine.

Conventional gas turbine engines have been designed with an interface between the combustor basket and the transition. FIG. 1 provides a cross-sectional view of a prior art interface 110 where the combustor basket 112 is positioned within the transition 114 of a gas turbine engine 116. A flow 115 of hot gas which passes from the combustor basket 112 and into the transition 114 experiences a change in diameter 123 as the flow 115 passes from a smaller diameter 125 of the combustor basket 112 into a larger diameter 127 of the transition 114. Note that the change in diameter 123 depicted in FIG. 1 is half of the total change in diameter experienced by the flow 115 of hot gas passing from the combustor basket 112 to the transition 114. A spring clip seal 120 is positioned within a gap 121 between the combustor basket 112 and the transition 114, to prevent a flow of compressed air from a region 117 outside the transition 114 from mixing with the flow 115 of hot gas within the transition 114.

Although conventional gas turbine engines do provide an interface between the combustor basket and the transition, the conventional interface design has notable drawbacks. For example, the selection of sealing arrangements for the interface is primarily limited to the spring clip seal 120, based on the positional arrangement of the combustor basket 112 within the transition 114. Accordingly, there is little or no latitude to select from a variety of sealing arrangements at the interface 110, in order to achieve a desired level of sealing. Additionally, for example, as the hot gas flow 115 experiences the change in diameter 123 in passing from the combustor basket 112 into the transition 114, a recirculating hot zone 119 is produced, where the dwell time, or duration over which the fuel/air mixture within the flow 115 burns, is extended, which may in-turn increase a peak temperature of the flow 115 above a maximum threshold, resulting in high stresses.

Additionally, the limited selection of the spring clip seal 120 does not provide uniform sealing around the circumference of the interface between the combustor basket 112 and the transition 114, and thus the combustor basket 112 and the transition 114 are not continuously aligned, resulting in uneven leakage around the circumference of the interface and an uneven change in the diameter 123 around the circumference of the interface resulting in combustion instabilities and/or high emissions.

Thus, it would be advantageous to provide an interface between the combustor basket and the transition, which avoids the shortcomings of the conventional interface design.

BRIEF DESCRIPTION OF THE DRAWINGS

The invention is explained in the following description in view of the drawings that show.

DETAILED DESCRIPTION OF THE INVENTION

The present inventors have recognized several limitations of the conventional interface design used between the combustor basket and the transition of a gas turbine engine. As discussed above, the positional arrangement of the combustor basket within the transition limits the sealing arrangement to a spring clip seal between the combustor basket and the transition. Based on inherent sealing limitations of a spring clip seal, the design of the conventional interface cannot be adjusted to achieve a desired level of sealing and/or leakage of compressed air from outside the transition. For example, a desired level of leakage of compressed air from outside of the transition through a gap of the interface may provide a degree of cooling to the interface and/or purge the gap of the interface from stagnant hot gas. The present inventors have recognized that the interface between the combustor basket and the transition may be designed such that any of a number of sealing arrangements may be utilized, in order to controllably adjust the level of leakage of compressed air through the interface.

Additionally, the present inventors have recognized that the change in the diameter of the hot gas flow from the combustor basket into the transition causes undesired effects on the performance of the gas turbine engine, such as high stresses, combustion instabilities, and/or high emissions. Accordingly, the present inventors have designed an interface between the combustor basket and the transition over which there is no substantial change in the diameter of the hot gas flow. As a result, the hot gas flow does not enter a recirculating hot zone which tends to increase the peak temperature and stresses.

Additionally, the present inventors have recognized that the conventional interface arrangement of the spring clip seal positioned between the combustor basket and the transition introduces an uneven sealing and an uneven change in the diameter of the hot gas flow, around the circumference of the interface. Accordingly, the present inventors have introduced an interface arrangement where the sealing arrangement provides a substantially uniform level of sealing around the circumference of the interface, and where there is no substantial change in the diameter of the gas flow around the circumference of the interface. As a result, the combustor basket and the transition are aligned such that the centerlines of the combustor basket and the transition are aligned during an operation of the gas turbine engine.

Figure 2:
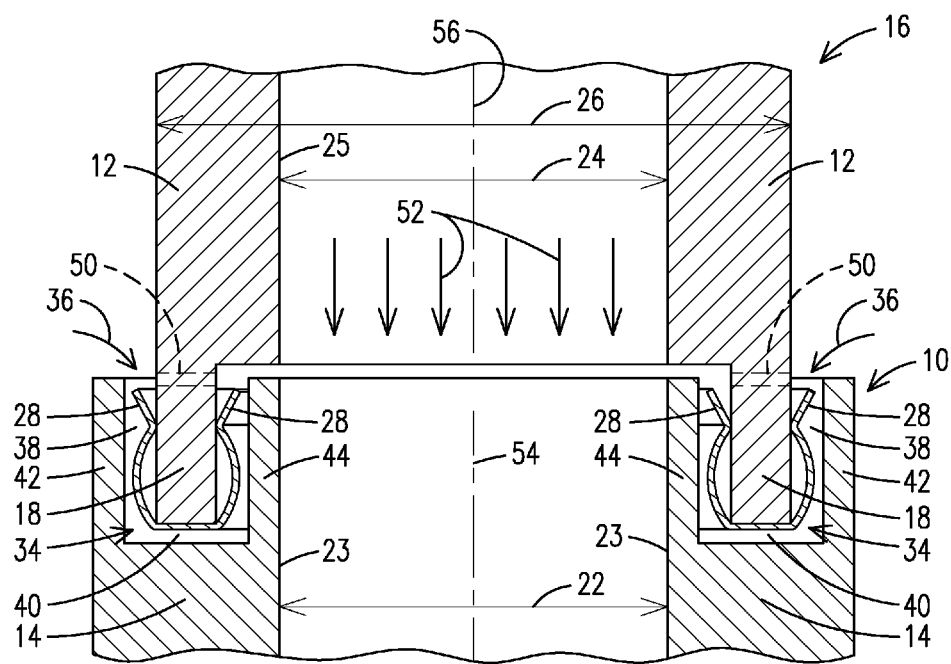
FIG. 2 is a cross-sectional view of an interface between a combustor basket and a transition.
Figure 3:
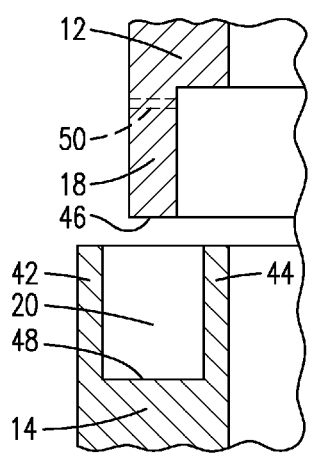
FIG. 3 is a partial cross-sectional view of the combustor basket and the transition of FIG. 2.

FIG. 2 illustrates an interface 10 between a combustor basket 12 and a transition 14 of a gas turbine engine 16. As discussed above, the transition 14 is provided for each of a plurality of combustor baskets 12, which are arranged radially about a longitudinal axis (not shown) of the gas turbine engine 16. As illustrated in FIG. 3, the interface 10 includes a tongue 18 which is formed in the combustor basket 12 and a groove 20 that is formed in the transition 14. A flow of hot gas passes along a combustion gas flow axis 52 from the combustor basket 12 and into the transition 14 through the interface 10.

Figure 1:
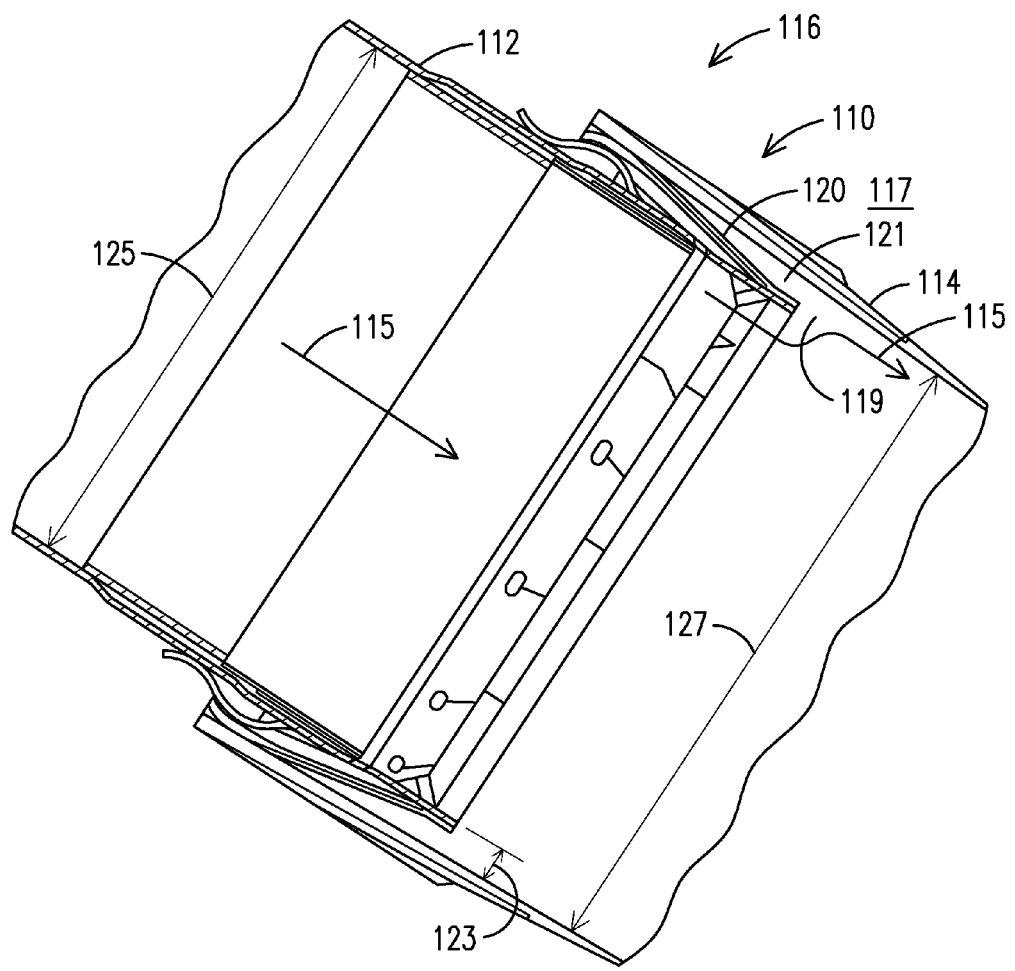
FIG. 1 is a cross-sectional view of a prior art interface between a combustor basket and a transition.

As illustrated in FIG. 2, the tongue 18 is received within the groove 20, to define the interface 10. As discussed in another embodiment of the present invention, although FIGS. 2-3 illustrate the tongue formed in the combustor basket and the groove formed in the transition, the tongue may be formed in the transition and the groove may be formed in the combustor basket. As further illustrated in FIG. 2, an inner diameter 22 of the transition 14 is aligned with an inner diameter 24 of the combustor basket 12 at the interface 10, such that respective inner surfaces 23,25 of the transition 14 and the combustor basket 12 are aligned along a direction of the combustion gas flow axis 52 of the hot gas from the combustor basket 12 into the transition 14. As further illustrated in FIG. 2, the inner diameter 22 of the transition 14 is less than an outer diameter 26 of the combustor basket 12 at the interface 10. As further illustrated in FIG. 2, the combustor basket 12 and the transition 14 are aligned, such that an axial centerline 56 of the combustor basket 12 is aligned with an axial centerline 54 of the transition 14. Since the axial centerlines 54,56 of the transition 14 and the combustor basket 12 are aligned, the respective inner surfaces 23,25 are aligned on both sides of the interface 10. As illustrated in FIG. 1, the prior art interface 110 arrangement features the spring clip seal 120, which inherently causes a misalignment between the combustor basket 112 and the transition 114, resulting in an even change in the diameter 123 between opposing sides of the interface 110. Thus, one side of the interface 110 may experience a large drop in the inner diameter from the combustor basket 112 to the transition 114, while the opposing side may experience a small drop in the inner diameter. As a result, the prior art interface 110 experiences misalignment and uneven sealing between the combustor basket 112 and the transition 114 at the interface 110. The interface 10 illustrated in FIG. 2 addresses this shortcoming, based on the alignment of the centerlines 54,56 and the alignment of the inner surfaces 23,25 on both sides of the interface 10. In an exemplary embodiment, a radial gap between the tongue 18 and an outer tongue 42 forming the groove 20 is less than the radial gap 121 (FIG. 1) between the combustor basket 112 and the transition 114 of the conventional interface 110, such that the conventional interface 110 has an increased tendency for axial misalignment.

During a design of the interface 10, a thickness of the transition 14 in the radial direction is adjusted, in order to accommodate the groove 20. In an exemplary embodiment, the radial thickness of the transition 14 may be greater than the radial thickness of the transition design without the groove. In an exemplary embodiment, the radial thickness of the transition design without the groove is in a range of 19 mm, for example. Additionally, a length of the tongue 18 and the groove 20 may be adjusted during a design phase of the combustor basket 12 and transition 14, such that the length of the tongue 18 does not exceed a threshold length in order to minimize stress and/or vibration of the tongue 18 within the groove 20, as well as to minimize the risk of the tongue 18 breaking off from the combustor basket 12. One of ordinary skill in the art can dimension the tongue 18 and the groove 20, such that the interface 10 arrangement is suitable, for a particular gas turbine engine 16. In an exemplary embodiment, the length of the tongue 18 is less than a length of the groove 20, in order to permit a minimum gap between the tongue 18 and the groove 20, to allow for thermal growth of the tongue 18 and/or the transition 14 surrounding the groove 20, for example. Additionally, the respective inner surfaces 23,25 of the transition 14 and the combustor basket 12 are designed such that a minimum gap is present at the interface 10 between the inner surfaces 23,25, to allow for thermal growth of the transition 14 and/or the combustor basket 12.

As further illustrated in FIG. 2, a seal 28 is positioned within a labyrinth path 34 formed between the tongue 18 and the groove 20. The seal 28 may be two individual spring seals on either side of the tongue 18 or a one-piece U-shaped spring seal. The seal 28 is selected to control a flow 36 of air through the labyrinth path 34 from outside the transition 14. As appreciated by one of skill in the art, the compressed cool air from the compressor (not shown) outside the transition 14 has a tendency to flow through the interface 10 and into the transition 14, since the pressure of the compressed air external to the transition 14 is greater than the pressure of the flow of hot gas within the transition 14.

As further illustrated in FIG. 2, the interface 10 includes a cooling hole 50 formed in the tongue 18 of the combustor basket 12. The cooling hole 50 directs at least part of the flow 36 of air from outside the transition 14 through a portion of the labyrinth path 34 between the tongue 18 and the groove 20 to inside the transition 14. Although FIG. 2 illustrates the cooling hole 50 formed within the tongue 18 of the combustor basket 12, the cooling hole need not be formed in the tongue and may be formed in the transition 14 or more specifically in one or both of a pair of tongues 42,44 which form the groove 20. Although the tongue/groove arrangement discussed above and illustrated in FIGS. 2-3 is depicted as having a rectangular cross-sectional form, the tongue/groove arrangement may take any form, provided that the interface of the tongue/groove arrangement provides a tortuous path for air flow. Additionally, although the interface discussed above and illustrated in FIGS. 2-3 depicts a seal 28 and a cooling hole 50 formed in the tongue 18, the embodiments of the present invention is not limited to this arrangement, and may use the seal or the cooling hole or neither, in which case the labyrinth path itself is used to control the flow 36 of air.

Figure 5:
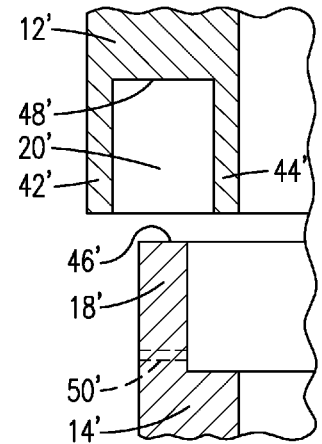
FIG. 5 is a partial cross-sectional view of the combustor basket and the transition of FIG. 4.
Figure 4:
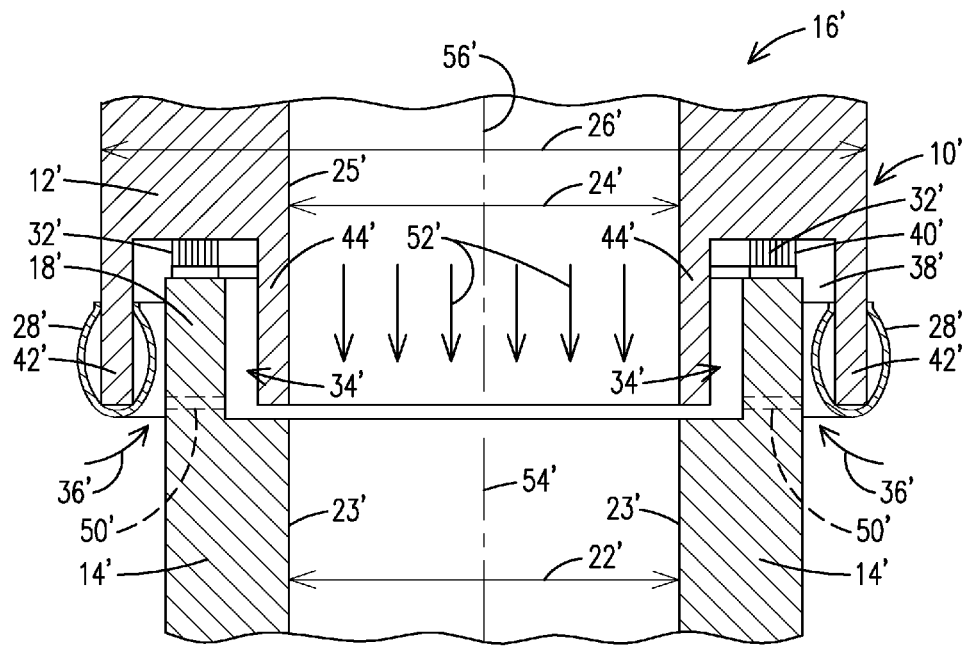
FIG. 4 is a cross-sectional view of an alternate interface between a combustor basket and a transition.

FIG. 4 illustrates an alternate interface 10' between a combustor basket 12' and a transition 14' of a gas turbine engine 16'. As illustrated in FIG. 5, unlike the interface 10 discussed above and illustrated in FIGS. 2-3, the interface 10' includes a tongue 18' formed in the transition 14' and a groove 20' formed in the combustor basket 12'. As with the interface 10 discussed above, a seal is positioned within a labyrinth path 34' formed between the tongue 18' and the groove 20'. However, the interface 10' illustrated in FIG. 4 features a plurality of seals 28',32' positioned within the labyrinth 34'. The seals 28',32' are selected from a variety of seals, and include a first seal such as spring seal 28' positioned along an axial length portion 38' of the labyrinth path 34' and a second seal such as a brush seal 32' positioned along a radial width portion 40' of the labyrinth path 34' between a base 46' of the tongue 18' and a base 48' of the groove 20'. In an exemplary embodiment, the spring seal 28' may include a U-shaped inner sheet securely pressed within a U-shaped outer sheet. The inner/outer sheets respectively include spaced apart segments in a direction perpendicular to an axial direction, with radial slots between the spaced apart segments. The radial slots of the inner sheet are misaligned with the radial slots of the outer sheet, to control an amount of flow through the U-shaped seal 28'. The seals 28',32' are selected to control a flow 36' of air through the labyrinth 34' from outside the transition 14', in order to achieve a desired flow of air through the labyrinth. Although FIGS. 4-5 illustrate a pair of seals 28',32' and a cooling hole 50' used within the interface 10', the embodiments of the present invention are not limited to this arrangement, and any combination of the seals 28',32' and cooling hole 50' may be utilized, such as one of the seals 28',32' and the cooling hole 50', for example. Additionally, although FIGS. 4-5 illustrate a single cooling hole 50', more than one cooling hole may be utilized within the interface 10', and may be formed within either of the transition 14' or the combustor basket 12', for example. Those elements of the alternate interface 10' illustrated in FIGS. 4-5 and not discussed herein, are similar to the elements of the interface 10 discussed above, without prime notation, and require no further discussion herein.

Figure 6:
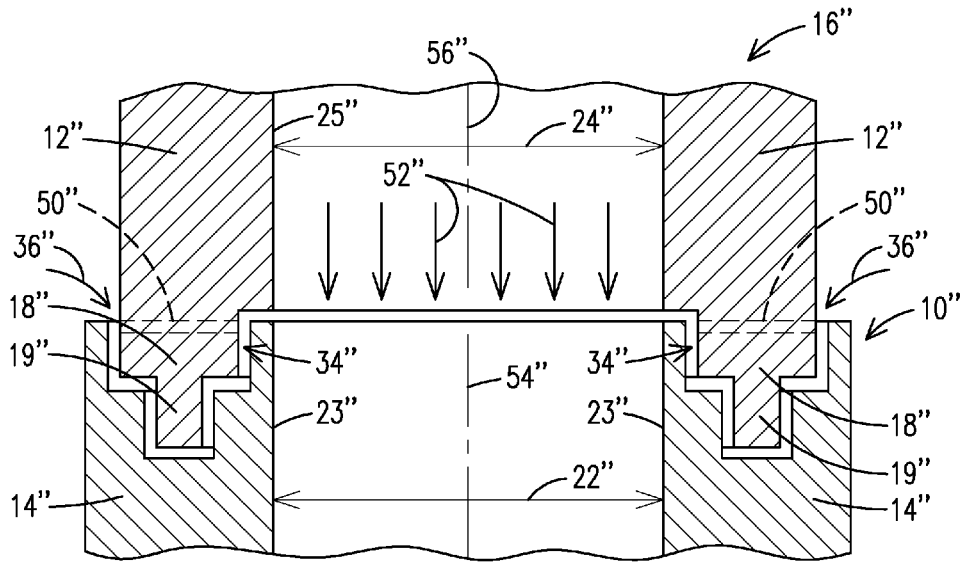
FIG. 6 is a cross-sectional view of an alternate interface between a combustor basket and a transition.
Figure 7:
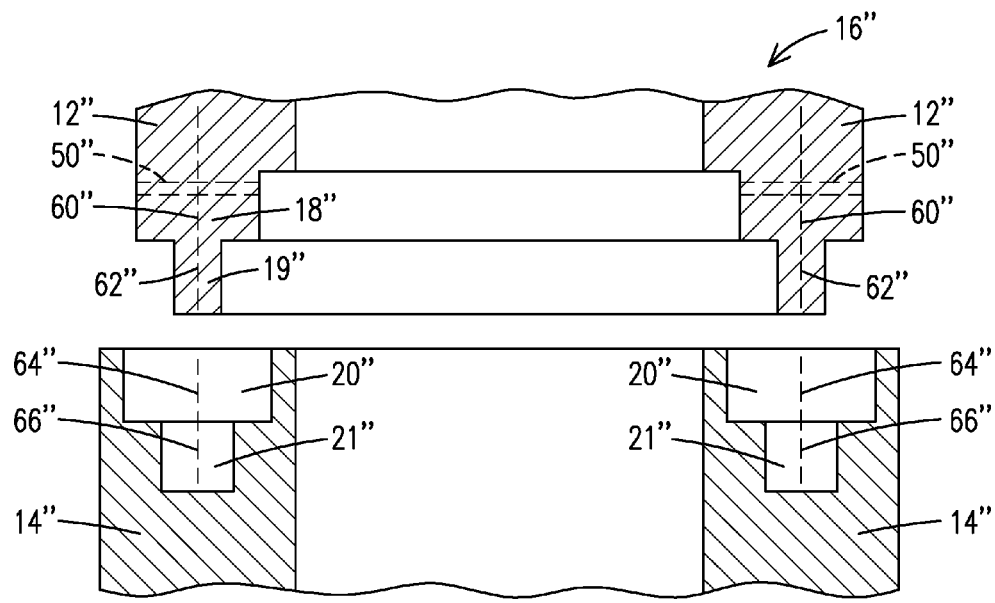
FIG. 7 is a partial cross-sectional view of the combustor basket and the transition of FIG. 6.

FIGS. 6-7 illustrate an alternate interface 10" between a combustor basket 12" and a transition 14" of a gas turbine engine 16". Unlike the interfaces 10,10' discussed above and illustrated in FIGS. 2-5, the interface 10" includes a pair of tongues 18",19" and a pair of grooves 20",21", such that a respective tongue 18",19" is received within a respective groove 20",21", to define the interface 10'". As illustrated in FIG. 7, the pair of tongues 18",19" include a first tongue 18" and a second tongue 19" whose central axes 60",62" are aligned. Additionally, as illustrated in FIG. 7, the pair of grooves 20",21" include a first groove 20" and a second groove 21" whose central axes 64",66" are aligned. As illustrated in FIG. 6, the first tongue 18" is received within the first groove 20" and the second tongue 19" is received within the second groove 21" such that a labyrinth path 34" formed between the pair of tongues 18",19" and the pair of grooves 20",21" is more tortuous than the labyrinth path 34 depicted in FIG. 2. As with the interface 10 of FIGS. 2-3, an inner diameter 22" of the transition 14" is axially aligned with an inner diameter 24" of the combustor basket 12". Those elements of the alternate interface 10" illustrated in FIGS. 6-7 and not discussed herein, are similar to the elements of the interface 10 discussed above, without double prime notation, and require no further discussion herein.

Figure 8:
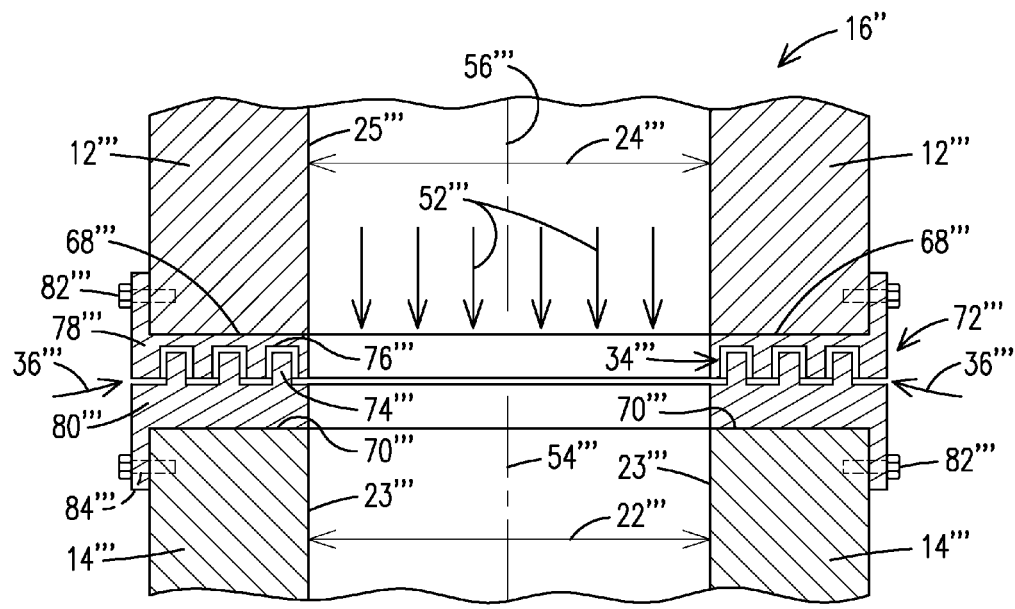
FIG. 8 is a cross-sectional view of an alternate interface between a combustor basket and a transition.

FIG. 8 illustrates a sealing arrangement 10'" between a combustor and a transition of a gas turbine engine 16'". The sealing arrangement 10'" includes an annular combustion outlet 12'" of the combustor, an annular transition inlet 14'" of the transition, and a labyrinth seal 72'" positioned between an end 68'" of the annular combustion outlet 12'" and an end 70'" of the annular transition inlet 14'" to form a labyrinth path 34'" there between. As with the interface 10 of FIGS. 2-3, an inner diameter 24'" of the annular combustion outlet 12'" is axially aligned with an inner diameter 22'" of the annular transition inlet 14'". The labyrinth seal 72'"includes a first L-shaped member 78'" attached to the annular combustion outlet end 68'", where a plurality of grooves 76'" are formed in the L-shaped member 78'". The labyrinth seal 72'" also includes a second L-shaped member 80'" attached to the annular transition outlet end 70'" with a plurality of tongues 74'". As with the previously discussed embodiments of FIGS. 2-5, the embodiment of the present invention is not limited to the arrangement depicted in FIG. 8 and the member 78'" with the grooves 76'" may be attached to the transition outlet end 70'" while the member 80'" with the tongues 74'" may be attached to the transition inlet end 68'". The first and second members 78'",80'" are attached to the respective ends 68'",70'" such that the tongues 74'" are received within the grooves 76'" to form the labyrinth path 34'". As illustrated in FIG. 8, the first and second members 78'",80'" are attached to the respective ends 68'",70'" by passing a bolt 82'" through a respective hole 84'" in the respective combustor outlet 12'" and transition inlet 14'". Although FIG. 8 illustrates a bolt securing arrangement of the first and second members 78'",80'" to the respective ends 68'",70'", the first and second members may be secured to the respective ends using any securing arrangement, such as a welding arrangement, for example, provided that the first and second members are securely attached to the respective ends. Although FIG. 8 illustrates that the members 78'",80'" are L-shaped, the embodiments of the present invention are not limited to this structure, and the members may take any form, provided that they are securable to the ends of the transition and the combustor, to form the labyrinth path.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An interface between a can combustor basket and a transition duct of a gas turbine engine such that combustion gases generated at the can combustor basket flow through the interface and into the transition duct, said interface comprising:
   a tongue formed at an end of one of the can combustor basket and the transition duct; and
   a groove formed at an end of another of the can combustor basket and the transition duct;
   wherein the tongue is received within the groove to form a labyrinth path between the tongue and the groove and to define the interface.

2. The interface of claim 1, wherein the tongue is formed at the end of the can combustor basket and the groove is formed at the end of the transition duct.

3. The interface of claim 1, wherein the tongue is formed at the end of the transition duct and the groove is formed at the end of the can combustor basket.

4. The interface of claim 1, wherein an inner diameter of the transition duct is aligned with an inner diameter of the can combustor basket about a combustion gas flow axis at the interface.

5. The interface of claim 1, wherein an inner diameter of the transition duct is less than an outer diameter of the can combustor basket at the interface.

6. The interface of claim 1, further comprising at least one seal positioned within the labyrinth path, said at least one seal selected to control a flow of air through the labyrinth path.

7. The interface of claim 6, wherein a plurality of seals are selected and positioned within the labyrinth path, said plurality of seals including a first seal positioned along an axial length portion of the labyrinth path, and a second seal positioned along a radial width portion of the labyrinth path.

8. The interface of claim 6, wherein said seal is a brush seal positioned along a radial width portion of the labyrinth path between a base of the tongue and a base of the groove.

9. The interface of claim 1, further comprising a cooling hole formed in one of the can combustor basket and the transition duct, wherein said cooling hole is configured to direct a flow of air from outside the transition duct through at least a portion of the labyrinth path to inside the transition duct.

10. A gas turbine engine comprising the interface of claim 1.

11. A gas turbine engine comprising:
a can combustor basket;
a transition duct;
an interface between the can combustor basket and the transition duct such that combustion gases generated at the can combustor basket flow through the interface and into the transition duct, said interface comprising;
a tongue formed at an end of one of the can combustor basket and the transition duct, and
a groove formed at an end of another of the can combustor basket and the transition duct,
wherein the tongue is received within the groove to form a labyrinth path between the tongue and the groove and to define the interface such that there is no substantial change in a diameter of the combustion gases flow around a circumference of the interface.

12. The gas turbine engine of claim 11, further comprising:
at least one seal positioned within the labyrinth path when the tongue is received within the groove;
wherein said at least one seal is selected to control a flow of air through the labyrinth path from outside the transition duct.

13. The gas turbine engine of claim 12, wherein a plurality of seals are selected and positioned within the labyrinth path, said plurality of seals including a first seal positioned along an axial length portion of the labyrinth path, and a second seal positioned along a radial width portion of the labyrinth path.

14. The gas turbine engine of claim 13, wherein said first seal is a spring seal and wherein said second seal is a brush seal positioned along the radial width portion between a base of the tongue and a base of the groove.

15. The gas turbine engine of claim 11, wherein said interface includes a pair of tongues and a pair of grooves, such that a respective tongue is received within a respective groove.

16. The gas turbine engine of claim 15, wherein said pair of tongues includes a first tongue and a second tongue whose central axes are aligned, and said pair of grooves includes a first groove and a second groove whose central axes are aligned; wherein said first tongue is received within said first groove and said second tongue is received within said second groove such that the labyrinth path formed between the pair of tongues and the pair of grooves is tortuous.

17. The interface of claim 1, wherein the tongue is received within the groove such that an axial centerline of the can combustor basket is aligned with an axial centerline of the transition duct at the interface.

18. The interface of claim 1, wherein a length of the tongue is less than a length of the groove at the interface.

19. The interface of claim 6, wherein the at least one seal is a one-piece U-shaped spring seal that is on either side of the tongue within the groove.

20. The interface of claim 1, wherein the tongue and the groove have a rectangular cross-sectional form.

21. An improvement of an interface between a can combustor basket and a transition duct of a gas turbine engine such that combustion gases generated at the can combustor basket flow through the interface and into the transition duct, said interface including a radial gap between an inner diameter of the transition duct and an outer diameter of the can combustor basket, said improvement comprising:
a tongue formed at an end of one of the can combustor basket and the transition duct; and
a groove formed at an end of another of the can combustor basket and the transition duct;
wherein the tongue is received within the groove to form a labyrinth path between the tongue and the groove to define the interface;
wherein the inner diameter of the transition duct is aligned with an inner diameter of the can combustor basket about a combustion gas flow axis at the interface.

* * * * *